Oct. 22, 1929.   O. A. LEATHERMAN   1,732,520
AUTOMOBILE LUNCH TABLE
Filed March 16, 1927   2 Sheets-Sheet 1
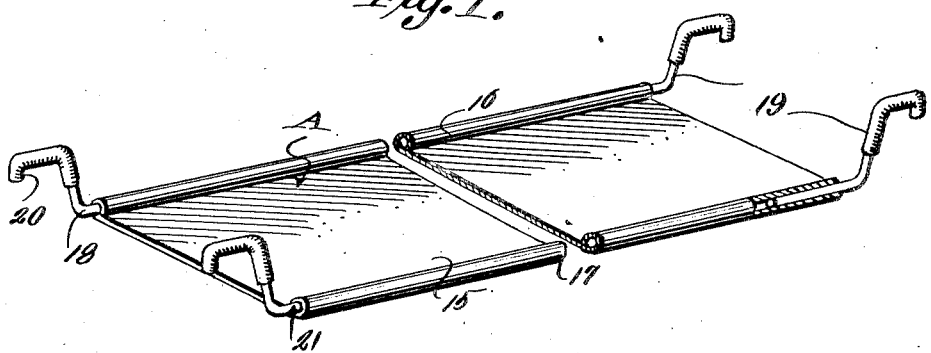
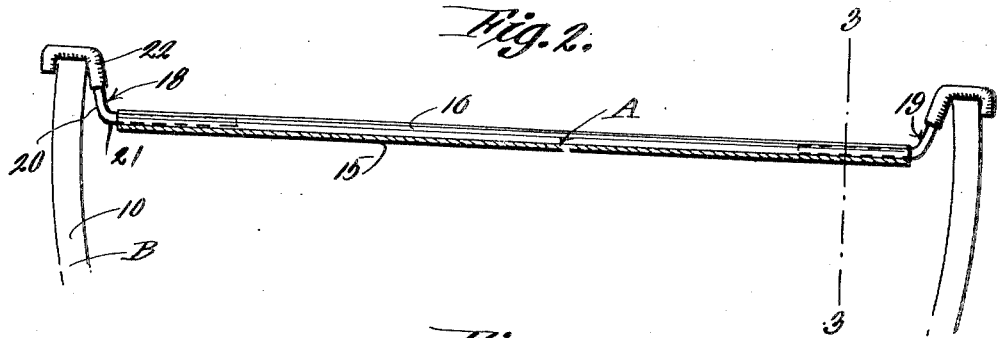
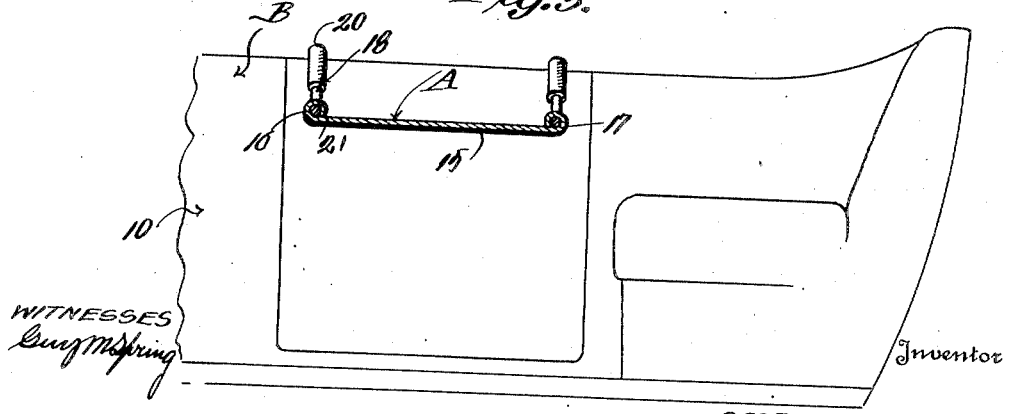
WITNESSES
Inventor
OCIE A. LEATHERMAN
By Richard B. Owen, Attorney Oct. 22, 1929.  O. A. LEATHERMAN  1,732,520
AUTOMOBILE LUNCH TABLE
Filed March 16, 1927  2 Sheets-Sheet 2
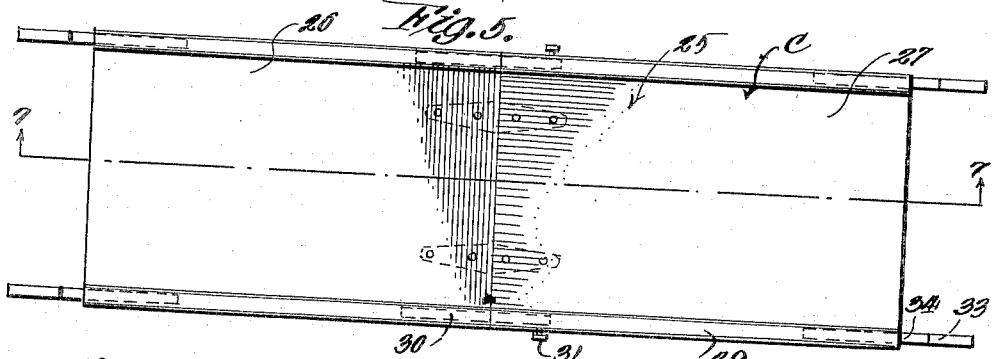
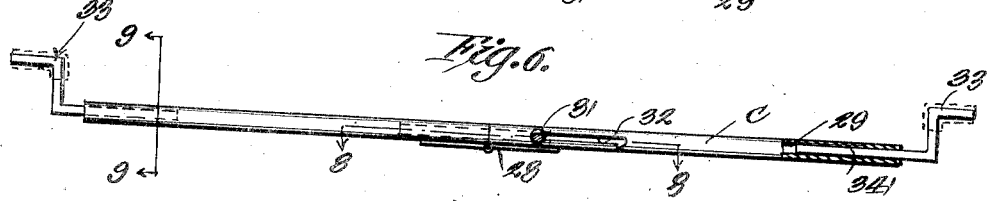
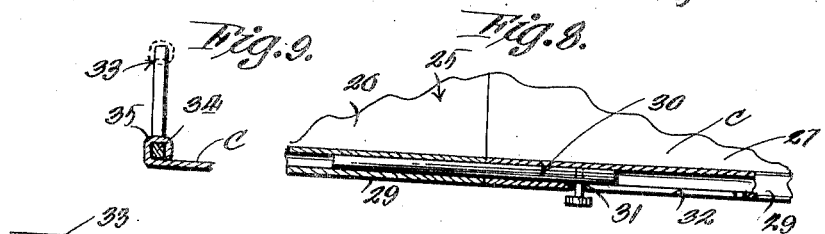
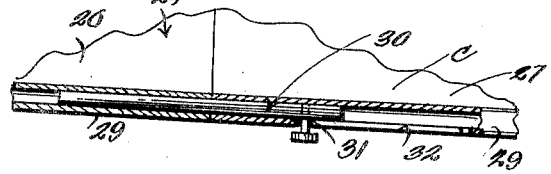
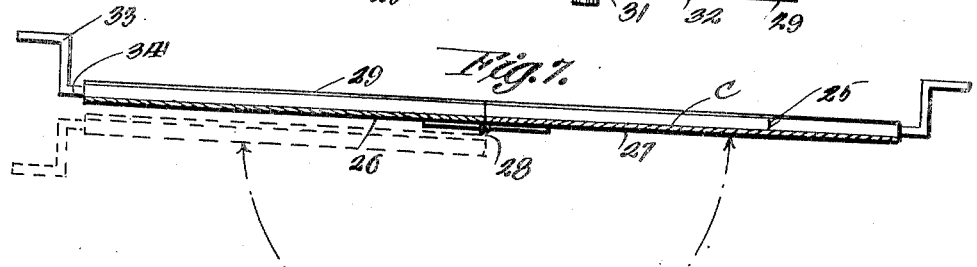
WITNESSES  
Guy M. Spring
Inventor  
OCIE A. LEATHERMAN
By Richard B. Owen, Attorney Patented Oct. 22, 1929

1,732,520

UNITED STATES PATENT OFFICE

OCIE A. LEATHERMAN, OF MOOREFIELD, WEST VIRGINIA, ASSIGNOR OF ONE-THIRD TO HERMAN SIONS, OF MOOREFIELD, WEST VIRGINIA

AUTOMOBILE LUNCH TABLE

Application filed March 16, 1927. Serial No. 175,838.

This invention relates to automobile appliances and more particularly to a table for detachable connection with the body of an automobile, for facilitating the serving of lunch, and the like.

One of the primary objects of the present invention is to provide an automobile table which can be readily detachably connected with the body thereof and which can be readily adjusted to conform to the width of the automobile body.

Another object of the invention is to provide a table attachment for automobiles embodying a body, reinforcing ribs and guides on the longitudinal edges thereof for detachably and adjustably receiving supporting hooks, the hooks being adapted to engage in the sides of the automobile body forwardly of the rear seat thereof, the removal of the hooks from the table body allowing the table to be compactly folded away.

A further object of the invention is to provide a table attachment for automobiles including a body with adjustable and detachable means associated with the terminals thereof for engaging the sides of the automobile body, the table body being hinged transversely to permit the compact folding of the table, novel means being provided for holding the sections of the table body in longitudinal alinement against collapsing movement, when the table is in use.

A still further object of the invention is to provide a table attachment for automobiles of the above character, which will be durable and efficient in use, one that will be simple and easy to manufacture and one which can be placed upon the market and incorporated with a conventional automobile at a small cost.

With these and other objects in view, the invention consists in the novel construction, and formation of parts, as will be hereinafter more specifically described, claimed, and illustrated in the accompanying drawings, in which drawings:

Figure 1 is a perspective view of the improved table attachment,

Figure 2 is a central longitudinal section through the table attachment showing the same in operative position on the body of an automobile, Figure 3 is a transverse section of the table attachment taken on the line 3—3 of Figure 2 showing the table associated with an automobile, Figure 4 is an end elevation of a modified form of the table, Figure 5 is a top plan view of the modified form of the table, Figure 6 is a side elevaton of the modified form of table, Figure 7 is a longitudinal section through the table taken on the line 7—7 of Figure 5 looking in the direction of the arrows, Figure 8 is a detail section taken on the line 8—8 of Figure 6 looking in the direction of the arrows illustrating the novel means for holding the sections of the modified form of the table in longitudinal alinement against accidental swinging movement, and Figure 9 is a detail section taken on the line 9—9 of Figure 6 looking in the direction of the arrows illustrating the means of associating one of the novel adjustable and attachable supporting hooks with the table.

Referring to the drawings in detail, wherein similar reference characters designate corresponding parts throughout the several views, the letter A generally indicates the improved table attachment, and B an automobile, with which the same can be associated.

The automobile B forms no part of the present invention and has simply been shown to illustrate the use of the improved device. As shown the vehicle B includes a body 10, which in the present instance is of the open touring type.

The improved table attachment A comprises a flat longitudinally extending body or top 15, which is preferably formed of sheet metal of the desired gage and strength. The longitudinal edges of the table top or body 15 are rolled to provide reinforcing and guide beads 16 and 17.

In the present instance the beads 16 and 17 have been shown extended above the upper face of the table top, and if desired, these beads can be extended below the top arranged laterally thereof. However, it is preferred to arrange the beads to extend above the face of the table top so that these beads will act as stops for articles placed thereon. Means is carried by the ends of the table top for engaging the body 10 of the vehicle B, so as to hold the table top in a horizontal position. The means includes pairs of hooks 18 and 19 respectively. Each of these hooks comprise a bill 20 and an elongated shank 21, which is slidably mounted within the guide and reinforcing beads 16 and 17. The shanks of the hooks are freely removable from the guide and reinforcing beads, so that the hooks can be placed upon the upper surface of the table top, whereby the top can be secured in a compact manner. The bills 20 of the hooks are preferably covered by rubber tubing 22 or some other desirable type of padding, so as to prevent the marring of the body 10 of the vehicle by the hooks.

In use of the improved attachment, the pairs of hooks 18 and 19 arranged on the opposite sides of the top are hooked over the edges of the body 10 of the vehicle B in front of the rear seat of the automobile body and it is obvious that an efficient table will be had for the automobile for the serving of lunches or the like. The shanks 21 of the pairs of hooks are formed relatively long, so that the shanks can be slid into and out of the guides 16 and 17 whereby the attachment can be adjusted for different widths of cars.

In Figures 4 to 9 inclusive I have illustrated a modified form of the table, which is generally indicated by the reference character C. In this form of the table, means is provided for permitting the compact folding or collapsing of the table, so that the table will occupy a minimum amount of space in shipping or storing. As shown the table C comprises a top 25 including a pair of companion and like sections 26 and 27, which are connected together at their inner ends, by means of suitable hinges 28. The hinges are preferably connected at the lower face of the sections 26 and 27 so as to allow the sections to be folded back against one another. The side edges of the sections are also rolled so as to provide longitudinally extending guide and reinforcing beads 29, and these beads also preferably extend above the upper surface of the table top.

Means is provided for holding the sections 26 and 27 in alinement so as to prevent accidental or swinging movement thereof when the table is in use and this means includes sliding bolts 30 carried by the inner ends of the beads 29 of the sections 27. As shown the bolts 30 are provided with laterally extending manipulating knobs 31 which extend through slots 32 formed in the beads. When the sections are in their extended position in alinement the bolts 30 are slid toward the sections 26 and into the beads 29 thereof and it is obvious that a rigid connection will be had between the two sections. This forms an important feature of the device, as the bolts insures the top against collapsing when the same is in open position.

The outer ends of the sections carry hooks 33 engaging the sides of the vehicle body, as in the form A of the invention previously described. These hooks 33 each include elongated shanks 34 which are slidably mounted in the beads so that the hooks can be adjusted to different widths of vehicle bodies. The shanks can also be slid entirely out of the beads so as to permit the removal of the hooks entirely from the table top, when the table top is in its folded position.

Referring to Figure 9 of the drawings, it is to be noted that the ends of the beads can be of a polygonal shape in cross section as indicated by the reference character 35 and the shanks 34 can have a cross section similar to the cross section of the beads at this point, so that swinging or turning movement of the hooks in the beads will be prevented.

From the foregoing description, it can be seen that a novel table attachment for automobiles has been provided, which can be conveniently and quickly set in position on the vehicle body for use. Owing to the light weight of the attachment and the fact that the attachment will occupy a minimum amount of space when not in use, the same can be conveniently carried by the automobile and can be stored under the rear seat if desired.

Changes in details may be made without departing from the spirit or the scope of this invention, but:

What I claim as new is:

A table attachment for automobiles comprising a table top including a pair of companion sections, reinforcing guide beads formed on the longitudinal edges of the sections and extending throughout the length of said sections, said beads extending above the upper faces of the sections, the lower faces of the sections being left plain throughout, hinges secured to said lower faces and connecting said sections together to permit said sections to fold with their lower faces one upon the other, the opposite ends of the reinforcing beads being left open, slide bolts mounted in the inner ends of the beads of one of the sections for projection into the inner ends of the beads of the other section for holding the sections in their extended operative position, and means carried by the outer ends of the beads of both sections for engaging the body of an automobile.

In testimony whereof I affix my signature.

OCIE A. LEATHERMAN.